United States Patent
Kepner et al.

(10) Patent No.: US 10,311,857 B2
(45) Date of Patent: Jun. 4, 2019

(54) SESSION TEXT-TO-SPEECH CONVERSION

(71) Applicant: Microsoft Technology Licensing, LLC, Redmond, WA (US)

(72) Inventors: Jason Kepner, Snoqualmie, WA (US); Evelyn R. Thomas, Bellevue, WA (US); David Ruzyski, Kirkland, WA (US); Jeremy L. Dewey, Duvall, WA (US); Martin Hall, Sammamish, WA (US); Joshua R. McCammon, Redmond, WA (US); Stephen E. Giscombe, Seattle, WA (US); Thomas Cooper, Seattle, WA (US); Dana Ludwig, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/491,854

(22) Filed: Apr. 19, 2017

(65) Prior Publication Data

US 2018/0166065 A1 Jun. 14, 2018

Related U.S. Application Data

(60) Provisional application No. 62/432,551, filed on Dec. 9, 2016.

(51) Int. Cl.
*G10L 13/08* (2013.01)
*G10L 13/033* (2013.01)
(Continued)

(52) U.S. Cl.
CPC .............. *G10L 13/08* (2013.01); *A63F 13/30* (2014.09); *A63F 13/87* (2014.09); *G10L 13/033* (2013.01);
(Continued)

(58) Field of Classification Search
None
See application file for complete search history.

(56) References Cited

U.S. PATENT DOCUMENTS 6,183,367 B1 * 2/2001 Kaji ........................ A63F 13/12
345/418
7,203,648 B1 * 4/2007 Ostermann .......... G09B 21/009
704/260

(Continued)

OTHER PUBLICATIONS

"API Reference: GameKit", https://developer.apple.com/reference/gamekit, Retrieved on: Oct. 27, 2016, 5 pages.
(Continued)

*Primary Examiner* — Douglas Godbold
(74) *Attorney, Agent, or Firm* — Newport IP, LLC; Jacob P. Rohwer

(57) ABSTRACT

Examples described herein provide various devices that enable users to participate in a multiplayer session. The examples allow a user that is unable to speak, or that is incapable of speaking, to participate in an in-session voice chat by inputting text and having the text converted to speech (e.g., synthesized voice data) that can then be sent to other devices participating in the session. The user enables a text-to-speech conversion feature on his or her own device. Based on the enabled feature, functionality enabling text to be entered is activated and the entered text is converted into speech data.

20 Claims, 8 Drawing Sheets

(51) Int. Cl.
*A63F 13/87* (2014.01)
*A63F 13/30* (2014.01)
*H04L 12/58* (2006.01)
*G10L 13/04* (2013.01)

(52) U.S. Cl.
CPC ............ *H04L 51/04* (2013.01); *H04L 51/046* (2013.01); *H04L 51/066* (2013.01); *G10L 13/043* (2013.01)

(56) References Cited

U.S. PATENT DOCUMENTS

| | | | |
|---|---|---|---|
| 8,825,642 | B2 | 9/2014 | Zatkin et al. |
| 9,227,140 | B2 | 1/2016 | Muller |
| 9,881,007 | B2 * | 1/2018 | Orsini .................... G06F 17/289 |
| 2002/0069069 | A1 | 6/2002 | Kanevsky et al. |
| 2004/0267527 | A1 * | 12/2004 | Creamer ............. G10L 19/0018 704/235 |
| 2005/0159833 | A1 * | 7/2005 | Giaimo .................... A63F 13/12 700/94 |
| 2006/0025214 | A1 | 2/2006 | Smith |
| 2006/0203009 | A1 * | 9/2006 | Nakajima ............... A63F 13/10 345/619 |
| 2007/0260984 | A1 * | 11/2007 | Marks .................... A63F 13/06 715/706 |
| 2009/0063156 | A1 * | 3/2009 | Squedin .................. A63F 13/12 704/261 |
| 2011/0092187 | A1 | 4/2011 | Miller |
| 2012/0110456 | A1 | 5/2012 | Larco et al. |
| 2013/0288777 | A1 | 10/2013 | Short et al. |
| 2014/0046891 | A1 | 2/2014 | Banas |
| 2016/0140951 | A1 * | 5/2016 | Agiomyrgiannakis ...................... G10L 13/02 704/260 |
| 2017/0003740 | A1 | 1/2017 | Verfaillie et al. |
| 2017/0182426 | A1 * | 6/2017 | Loeb ........................ A63F 13/87 |
| 2017/0186418 | A1 * | 6/2017 | Mairano ................. G10L 13/10 |

OTHER PUBLICATIONS

Cervantes, Edgar, "Google Text-to-speech adds multiple male and female voices", http://www.androidauthority.com/google-text-to-speech-multiple-male-female-voices-673214/, Published on: Feb. 13, 2016, 5 pages.

"In Game Chat for Deaf Players", http://us.battle.net/forums/en/wow/topic/20749266857, Retrieved on: Oct. 27, 2016, 3 pages.

"Discord", https://discordapp.com/, Retrieved on: Oct. 27, 2016, 1 pages.

Woollaston, Victoria, "The app that lets deaf people 'hear' phone calls: Pedius converts speech to text in real time", http://www.dailymail.co.uk/sciencetech/article-2965063/The-app-lets-deaf-people-hear-phone-calls-Pedius-converts-speech-text-real-time.html, Published on: Feb. 2015, 17 pages.

Mahini, Ladan, "Deaftel Makes Phone Conversations a Reality for the Deaf", https://www.twilio.com/blog/2012/03/deaftel-makes-phone-conversations-a-reality-for-the-deaf.html, Published on: Mar. 28, 2012, 6 pages.

Soltani, et al., "Developing a gesture-based game for deaf/mute people Using microsoft Kinect", In Proceedings of Sixth International Conference on Complex, Intelligent, and Software Intensive Systems, Jul. 4, 2012, pp. 494-495.

Lomas, Natasha, "Telegram levels up its bot platform with competitive games that live inside chats", https://techcrunch.com/2016/10/03/telegram-levels-up-its-bot-platform-with-competitive-games-that-live-inside-chats/, Published on: Oct. 3, 2016, 9 pages.

"Non Final Office Action Issued in U.S. Appl. No. 15/491,818", dated Apr. 4, 2018, 15 Pages.

\* cited by examiner

SESSION TEXT-TO-SPEECH CONVERSION

PRIORITY APPLICATION

This application claims the benefit of and priority to U.S. Provisional Application No. 62/432,551, filed Dec. 9, 2016, the entire contents of which are incorporated herein by reference.

BACKGROUND

A multiplayer session provides players of a video game with the ability to compete against other players either individually or in a team setting. Existing systems and services can provide functionality for a group of players participating in a multiplayer session to audibly communicate with one another using an in-session voice "chat" service. However, a player may be unable to, or the player may be incapable of, using voice to communicate with the other players participating in the multiplayer session. For example, a player may have a disability such that the player is incapable of speaking (e.g., the player is mute or has a speaking impairment that makes it difficult for others to understand what is being said). In another example, a player may be playing a video game in a quiet location where speaking out load (e.g., into a microphone) will disrupt other people close to the player (e.g., the quiet location may be a library where others are quietly reading or a room where an infant or a small child has fallen asleep, etc.). Without the ability and/or capability to speak with other players via the use of the in-session voice chat service, the player can be disconnected from the complete gaming experience.

SUMMARY

This disclosure describes systems and techniques that allow participants in a multiplayer session that are unable to speak (e.g., a player in a quiet location) or that are incapable of speaking (e.g., a player with a speaking impairment) to still participate in voice chat during the multiplayer session. A multiplayer session can be provided and/or hosted by resources (e.g., program code executable to generate game content, devices such as a server, networking functionality, etc.) developed and/or operated by a title. Thus, the title can comprise resources related to a developer and/or a publisher of a multiplayer game, for example. Further, the multiplayer session can be executed on computing devices in order to allow users to participate in the multiplayer session. The computing devices can comprise "platform" components that are configured to generate and render platform content (e.g., chat functionality) that can enhance a session experience for a participant while the participant engages with the game content provided by the title (e.g., a player plays a game). Accordingly, session content displayed in a user interface of a display screen can include game content provided by a tile and platform content provided by a device on which the game content is being displayed. In various examples described herein, program code of a title executable to generate the game content is configured to access and use (e.g., via an application programming interface (API)) functionality of a platform component (e.g., an in-session voice chat component) so that the participants in the multiplayer session can exchange voice communications with one another. Accordingly, in some implementations, the techniques described herein can be implemented in part or in full by an in-session voice chat component.

As described herein, a participant who wants to chat with other participants but who is unable to speak or who is incapable of speaking clearly provides input to enable a text-to-speech (TTS) conversion feature. Based on the enabled TTS conversion feature, a device being used by the participant is configured to enable the participant to enter text input which can be converted to speech so that the participant can engage with other participants using the session voice chat functionality. In various examples, and to protect user privacy, a setting associated with the enabled TTS conversion feature indicates whether synthesized voice communications more reflect a female voice (e.g., a higher pitch) or a male voice (e.g., a lower pitch). In this way, a female participant with a speaking impairment that may not want to reveal her gender to others (e.g., when participating in a session with a group of males) can choose to use a synthesized voice of a male. Or by way of example, a male participant with a speaking impairment that may not want to reveal his gender to others (e.g., when participating in a session with a group of females) can choose to use a synthesized voice of a female.

In various examples, a notification of the enabled TTS conversion feature can be sent to a TTS conversion service configured to convert the text entered into speech data. The TTS conversion service can return the speech data to the device of the participant and the speech data can subsequently be sent to the other devices participating in the session (e.g., as synthesized voice data that is part of a stream). Alternatively, the TTS conversion service can send the speech data directly to the other devices participating in the session.

In further examples, the conversion of the text data to speech data can be implemented by the device at which the TTS conversion feature is enabled (e.g., a client computing device as described herein).

Based on the enabled TTS conversion feature, a text window is displayed within a user interface on a display screen so that the participant can view entered text, and upon completion of the text entry, the user can submits a command to have the text be sent to the TTS conversion service for conversion into speech data (e.g., synthesized voice data). In some examples, the participant can use a physical text entry mechanism (e.g., a physical keyboard, a controller chat pad, etc.) to enter the text to be converted. Alternatively, the participant can use a virtual text entry interface to enter the text to be converted. Accordingly, in addition to a text window, the virtual text entry interface can also be displayed within the user interface (e.g., in response to detecting that no physical text entry mechanism is connected to a device).

During the participant's engagement with the game content, the participant can provide input (e.g., select a button on a controller) that causes the virtual text entry interface and/or the text window to be displayed. In some instances, the text window and/or the virtual text entry interface are displayed over the game content (e.g., menu options, game graphics, game results, etc.) as the user participates in the session.

In various examples described herein, the virtual text entry interface can include standard text entry options (e.g., a QWERTY keyboard with individual options to enter characters and/or punctuation, a number pad with individual numbers, etc.). In this scenario, the virtual text entry interface can be rendered by a platform component of the device that can be called upon by a title of the session via an application programming interface (API).

In additional examples described herein, the virtual text entry interface can include custom text entry options. For instance, the custom text entry options can be words or phrases commonly used in a particular title of the session. Accordingly, in this scenario, the virtual text entry interface can be rendered by the title, and the title can define which common words or phrases are presented as individual text entry options. Moreover, the title may enable the user to define which common words or phrases are presented as individual text entry options.

In further examples described herein, the virtual text entry interface can include custom text entry options that are rendered by a platform component. In this scenario, the custom text entry options can be defined by a user.

In some examples, a sequence of inputs can be preconfigured to select a particular custom text entry option. For instance, selection of a particular direction of a directional pad of a controller may cause options that belong to a category of words or phrases to be displayed within the virtual text entry interface, and then a subsequent selection of a particular direction may cause one of the displayed options to be entered as text to be converted to speech.

As described herein, the TTS conversion service can be provided within a system that hosts and provides multiplayer session content (such as a server or a client computing device), or alternatively, the TTS conversion service can be provided by a separate system (e.g., a third-party system) that is not part of a system that hosts and provides multiplayer session content. In various examples, the TTS conversion service determines, or is informed of, a title of the multiplayer session. Based on the title, the TTS conversion service can access a conversion model that converts text to speech using a library of synthesized utterances that are specific to the title. Stated another way, the library can be used to map received text to the synthesized utterances. The TTS conversion service can generate and/or update the conversion model using machine learning techniques as text is converted to speech over a period of time. Use of the conversion model and/or the library that is specific to a title enables more efficient and more accurate conversion of text to speech (e.g., it reduces the latency associated with the conversion, decreases the likelihood of mispronounced words, etc.).

In the context of multiplayer sessions, many participants interact with other participants they do not even know, and thus, many participants do not want to be inconvenienced to accommodate a disability of another person. An example of an inconvenient accommodation is to require other participants to input a "chat" communication as text rather than speech. Accordingly, the enablement of the TTS conversion feature described herein alters the voice chat experience of one participant using one device but does not severely impact the voice chat experiences of the other participants using the other devices (e.g., the other participants will hear synthesized voice streams rather than a person's actual voice).

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Examples described herein provide various devices that enable users to participate in a multiplayer session. The examples allow a user that is unable to speak, or that is incapable of speaking, to participate in an in-session voice chat by inputting text and having the text converted to speech (e.g., synthesized voice data) that can then be sent to other devices participating in the session. The user enables a text-to-speech conversion feature on his or her own device. Based on the enabled feature, functionality enabling text to be entered is activated and the entered text can be converted into speech data.

As described above, existing voice chat functionality implemented in association with multiplayer sessions is unable to accommodate a person with a speaking impairment or a person located in a quiet area. Various examples, scenarios, and aspects described below with reference to FIGS. 1-8 accommodate a person with a speaking impairment or a person located in a quiet area by converting text data into speech data.

Figure 1:
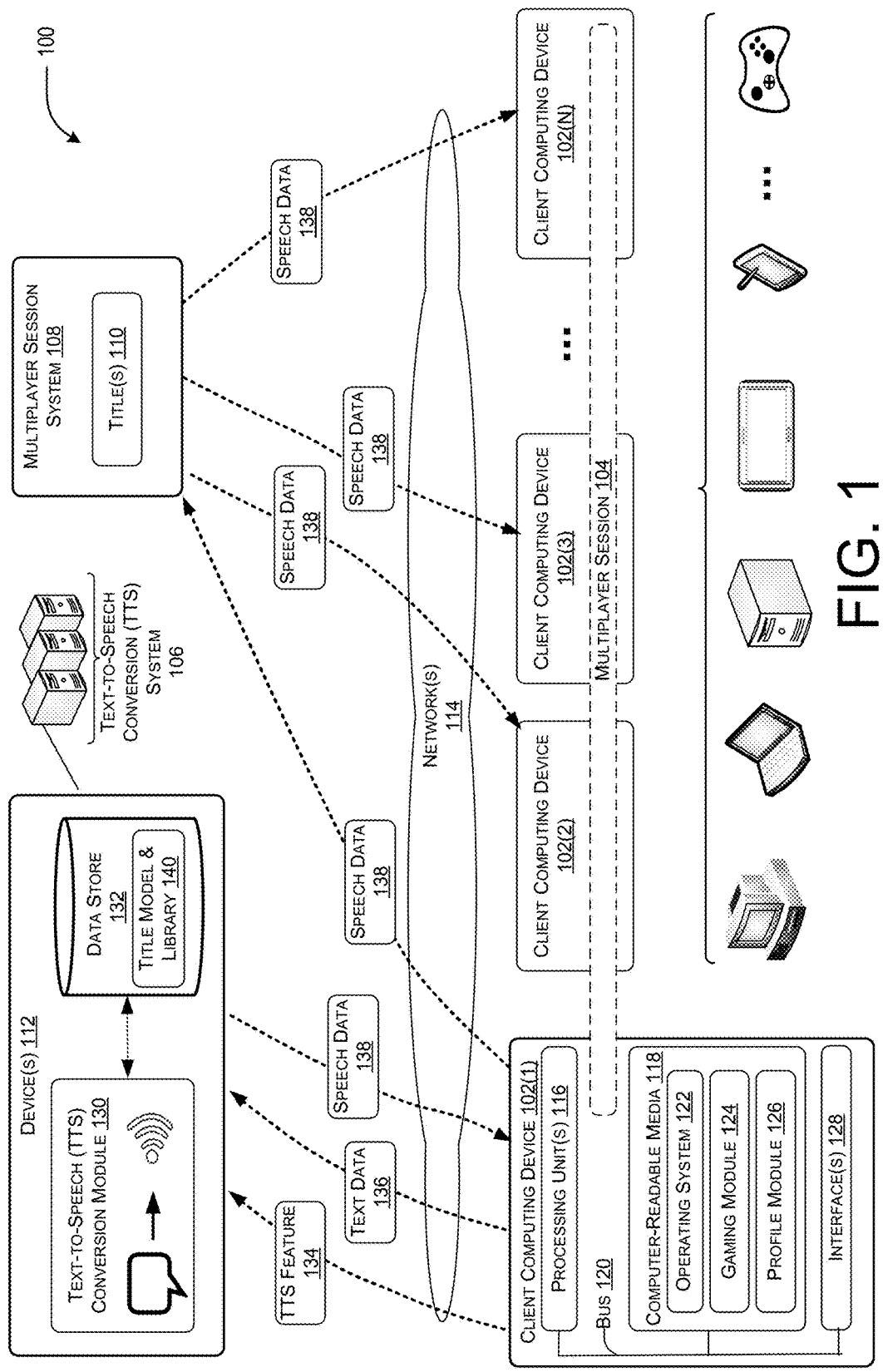
FIG. 1 is a diagram illustrating an example environment in which a client computing device participating in a multiplayer session can enable a feature that causes a text-to-speech conversion system to convert text to speech (e.g., synthesized voice data) so a user of the client computing device can participate in an in-session voice chat with other users without having to speak.

FIG. 1 is a diagram illustrating an example environment 100 in which a client computing device 102(1) participating in a multiplayer session 104 can enable a feature that causes a text-to-speech conversion system 106 (e.g., a text-to-speech conversion service) to convert text to speech (e.g., synthesized voice data) so a user (e.g., may be referred to herein as a participant and/or player) of the client computing device 102(1) can participate in an in-session voice chat with other users of other client computing devices 102(2) . . . 102(N) without having to speak (where N is a positive integer number such as two, three, four, five, ten, fifteen, twenty, fifty, one hundred, and so forth).

The client computing devices 102(1) . . . 102(N) enable their respective users to participate, individually or as a team, in the multiplayer session 104. The multiplayer session 104 can be hosted, over a network, by a multiplayer session system 108 (e.g., PLAYSTATION NOW, NINTENDO NETWORK, XBOX LIVE, etc.). In some examples, the multiplayer session system 108 can provide game content based on various title(s) 110 so that users of the client computing devices 102(1) . . . 102(N) can participate in the multiplayer session 104. As mentioned above, a title 110 can comprise resources (e.g., program code, devices, networking functionality, etc.) useable to execute the multiplayer session 104 across the client computing devices 102(1) . . . 102(N). A title 110 can be associated with an action game, a fighting game, a war game, a role playing game, a strategy game, a racing game, a sports game, or the like. In some implementations, a title 110 may operate the multiplayer session system 108. As an alternative and in accordance with a title 110, the multiplayer session 104 can be hosted by one of the client computing devices 102(1) . . . 102(N) without a multiplayer session system 108 (e.g., via peer-to-peer network communications).

The text-to-speech (TTS) conversion system 106 comprises device(s) 112 that provide a service that converts text data to speech data. The device(s) 112 and/or other components of the TTS conversion system 106 can include distributed computing resources that communicate with one another, with the multiplayer session system 108, and/or with the client computing devices 102(1) . . . 102(N) via one or more network(s) 114. Network(s) 114 can include, for example, public networks such as the Internet, private networks such as an institutional and/or personal intranet, or some combination of private and public networks. Network(s) 114 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 114 can utilize communications protocols, including packet-based and/or datagram-based protocols such as internet protocol (IP), transmission control protocol (TCP), user datagram protocol (UDP), or other types of protocols. Moreover, network(s) 114 can also include a number of devices that facilitate network communications and/or form a hardware basis for the networks, such as switches, routers, gateways, access points, firewalls, base stations, repeaters, backbone devices, and the like.

In some examples, network(s) 114 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, device(s) 112 can include one or more computing devices that operate in a cluster or other grouped configuration to share resources, balance load, increase performance, provide fail-over support or redundancy, or for other purposes. For instance, device(s) 112 can belong to a variety of classes of devices such as traditional server-type devices, desktop computer-type devices, and/or mobile-type devices. Thus, although illustrated as a single type of device—a server-type device—device(s) 112 can include a diverse variety of device types and are not limited to a particular type of device. Device(s) 112 can represent, but are not limited to, server computers, desktop computers, web-server computers, personal computers, mobile computers, laptop computers, tablet computers, or any other sort of computing device.

A client computing device (e.g., one of client computing device(s) 102(1) . . . 102(N)) can belong to a variety of classes of devices, which can be the same as, or different from, device(s) 112, such as traditional client-type devices, desktop computer-type devices, mobile-type devices, special purpose-type devices, embedded-type devices, and/or wearable-type devices. Thus, a client computing device can include, but is not limited to, a game console, a desktop computer, a gaming device, a tablet computer, a personal data assistant (PDA), a mobile phone/tablet hybrid, a laptop computer, a telecommunication device, a computer navigation type client computing device such as a satellite-based navigation system including a global positioning system (GPS) device, a wearable device, a virtual reality (VR) device, an augmented reality (AR) device, an implanted computing device, an automotive computer, a network-enabled television, a thin client, a terminal, an Internet of Things (IoT) device, a work station, a media player, a personal video recorders (PVR), a set-top box, a camera, an integrated component (e.g., a peripheral device) for inclusion in a computing device, an appliance, or any other sort of computing device. In some implementations, a client computing device includes input/output (I/O) interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display, a printer, audio speakers, a haptic output device, and the like).

Client computing device(s) 102(1) . . . 102(N) of the various classes and device types can represent any type of computing device having one or more processing unit(s) 116 operably connected to computer-readable media 118 such as via a bus 120, which in some instances can include one or more of a system bus, a data bus, an address bus, a PCI bus, a Mini-PCI bus, and any variety of local, peripheral, and/or independent buses.

Executable instructions stored on computer-readable media 118 can include, for example, an operating system 122, a gaming module 124, a profile module 126, and other modules, programs, or applications that are loadable and executable by processing units(s) 116.

Client computing device(s) 102(1) . . . 102(N) can also include one or more interface(s) 128 to enable communications between client computing device(s) 102(1) . . . 102(N) and other networked devices, such as device(s) 112 and/or devices of the multiplayer session system 108, over network(s) 114. Such interface(s) 128 can include one or more network interface controllers (NICs) or other types of transceiver devices to send and receive communications and/or data over a network.

In the example environment 100 of FIG. 1, client computing devices 102(1) . . . 102(N) can use their respective gaming module 124 to connect with one another and/or other external device(s) in order to participate in the multiplayer session 104. For instance, a player can utilize a client computing device 102(1) to access resources of a title 110. When executing the program code of title 110, for example, the player can select a multiplayer mode, which can cause the client computing device 102(1) to connect to a session hosting device and/or other client computing devices 102(2)

... 102(N) over the network 114. The player can then use the client computing device 102(1) to register as a player, and/or as a member of a team, view and/or play in the multiplayer session 104, and receive updates and/or results for the multiplayer session 104.

Accordingly, the client computing device(s) 102(1) ... 102(N) can use their respective profile modules 126 to generate participant profiles and to provide shareable information (e.g., non-private information authorized to be shared) of the participant profiles to other client computing devices, to session hosting devices, and/or to the device(s) 112 of the TTS conversion system 106. A participant profile can include one or more of an identity of a participant (e.g., a unique identifier such as a "gamer" tag or a participant tag, a name, etc.), a skill level of the participant, a rating for the participant, an age of the participant, a friends list for the participant, a location of the participant, etc. Participant profiles can be used to register participants for multiplayer sessions. In some examples, the TTS conversion system 106 and/or the multiplayer session system 108 maintain profile information (e.g., participant identity, skill, rating, etc.) and can provide, upon request and in accordance with privacy settings, some of the profile information to clients and/or services as required and as authorized.

As illustrated in FIG. 1, the device(s) 112 of the TTS conversion system 106 comprise a text-to-speech (TTS) conversion module 130 and a data store 132. As described above, a participant using client computing device 102(1) to play in the multiplayer session 104 may have a disability that affects his or her ability to speak. Or, the participant may be located in a quiet area where speaking out loud will distract others. Accordingly, the gaming module 124 allows the participant to enable a TTS conversion feature 134 for the multiplayer session 104. For instance, enablement of the TTS conversion feature 134 may inform an in-session voice chat component of a participant's inability or incapability of speaking. In various examples, the in-session voice chat component can be a "platform" component of the gaming module 124 and/or the operating system 122 that is called upon by the program code of a title (e.g., via an API) to provide voice chat communications during the multiplayer session 104.

In various examples, the client computing device 102(1) can send a notification of the TTS conversion feature 134 to the TTS conversion system 106. Based on the enabled TTS conversion feature 134, the client computing device 102(1) is configured to allow the participant to enter text. Subsequently, corresponding text data 136 is sent to the TTS conversion module 130 of the TTS conversion system 106 and the TTS conversion module 130 is configured to convert the text data into speech data 138 (e.g., synthesized voice data). Once converted, the TTS conversion module 130 can return the speech data 138 to the client computing device 102(1) so that it can be sent to the other client computing devices 102(2) ... 102(N) participating in the multiplayer session 104.

In alternative examples, the client computing device 102 (1) can comprise the TTS conversion module 130, and therefore, the functions and operations performed by the TTS conversion system 106, as described above, can also be performed by the client computing device 102(1). In this scenario, network communications may not be required to have the text converted into speech data.

To enable the entry of text, the gaming module 124 can cause a text window to be displayed. The text window can contain text that is entered by a user (e.g., via a physical text input mechanism such as a keyboard or a gamepad, via a virtual text entry interface). Moreover, the gaming module 124 can cause a virtual text entry interface to be displayed so the user can enter text via interaction with the display screen.

In various examples further described herein, the virtual text entry interface is rendered by a platform component of the client computing device 102(1) and is presented on top of the game content, which is rendered by a title 110. In alternative examples, the virtual text entry interface can be rendered by the title.

In various examples, the TTS conversion module 130 is configured to access a model and a library 140 based on a specific title of the multiplayer session 104. For instance, a conversion model can be used to convert text to speech using a library that maps words and/or phrases common to the title to synthesized utterances. The TTS conversion module 130 can generate and/or update the conversion model using machine learning techniques as text is converted into speech over a period of time.

Figure 2:
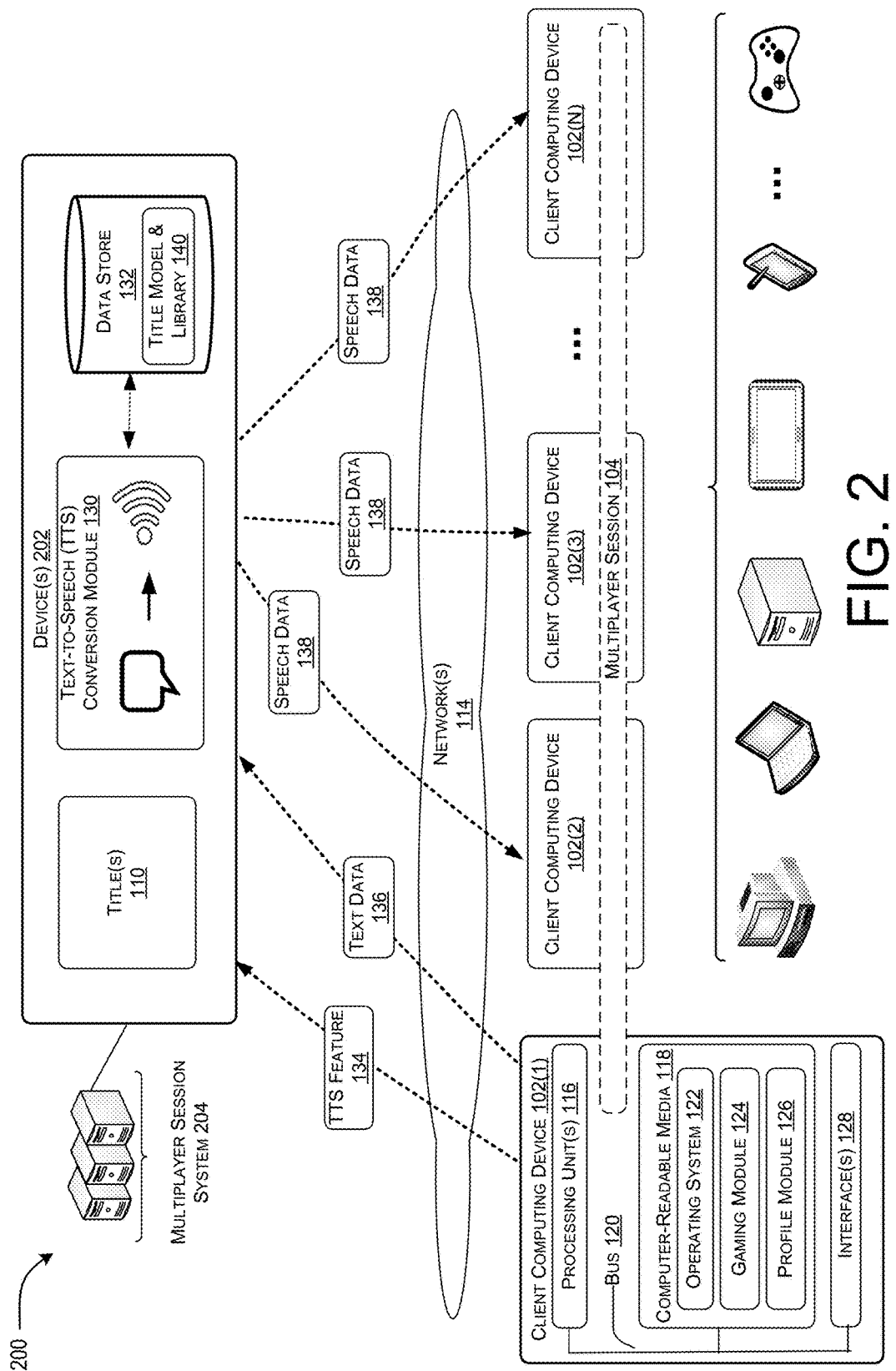
FIG. 2 is a diagram illustrating another example environment in which a client computing device participating in a multiplayer session can enable a feature that causes a text-to-speech conversion system to convert text to speech (e.g., synthesized voice data) so a user of the client computing device can participate in an in-session voice chat with other users without having to speak.

FIG. 2 is a diagram illustrating another example environment 200 in which a client computing device 102(1) participating in a multiplayer session 104 can enable a feature that causes a text-to-speech conversion system 106 to convert text to speech (e.g., synthesized voice data) so a user of the client computing device 102(1) can participate in an in-session voice chat with other users without having to speak.

The difference in the environment 200 of FIG. 2 compared to the environment 100 of FIG. 1 is that the TTS conversion module 130 is part of or operated in association with devices 202 of the multiplayer session system 204. Consequently, the TTS conversion module 130 can send the speech data 138 directly to the client computing devices 102(2) ... 102(N) (e.g., without having to first send it back to the client computing device 102(1)).

Figure 3:
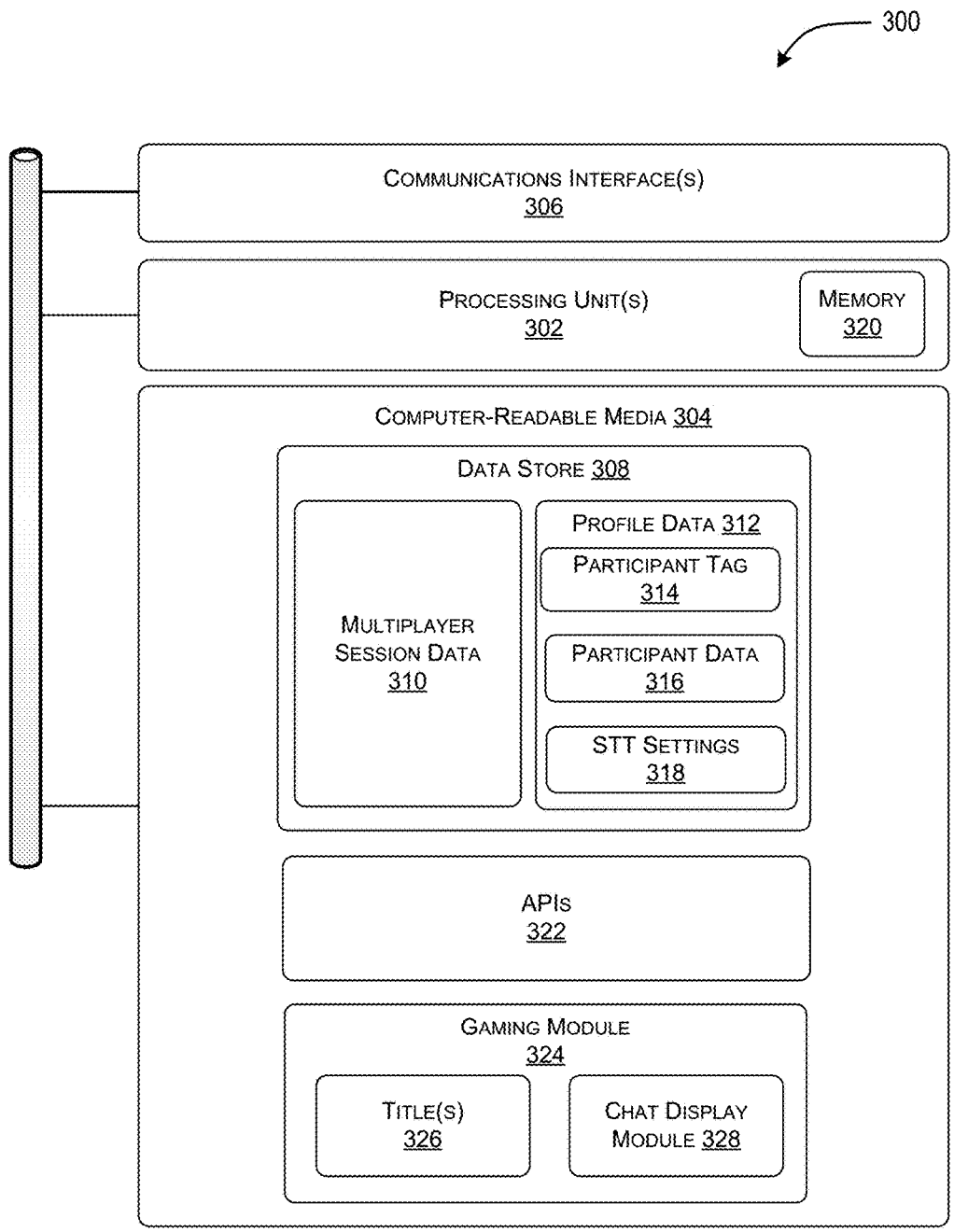
FIG. 3 is a diagram illustrating components of an example device configured to receive, as input, text to be converted to speech and/or to render a virtual text entry interface.

FIG. 3 is a diagram illustrating components of an example device 300 configured to receive, as input, text to be converted to speech and/or to render a virtual text entry interface within a user interface on a display screen. The example device 300 can be a client computing device (e.g., 102(1)), a device of multiplayer session system 108, or a device 202 of multiple player session system 204. In some instances, the components illustrated in FIG. 3 can be spread across various ones of the devices described herein.

Device 300 includes one or more processing unit(s) 302, computer-readable media 304, communication interface(s) 306. The components of device 300 can be operatively connected, for example, via a bus, which can include one or more of a system bus, a data bus, an address bus, a PCI bus, a Mini-PCI bus, and any variety of local, peripheral, and/or independent buses.

As used herein, processing unit(s), such as processing unit(s) 302, processing unit(s) 116, and/or processing unit(s) of other devices (e.g., devices 112), can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, computer-readable media, such as computer-readable media 304, computer-readable media 118, and/or computer-readable media of other devices (e.g., devices 112), can store instructions executable by the processing unit(s). Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 306 can represent, for example, network interface controllers (NICs) or other types of transceiver devices to send and receive communications over a network.

In the illustrated example, computer-readable media 304 can include a data store 308. In some examples, a data store includes data storage such as a database, data warehouse, or other type of structured or unstructured data storage. In some examples, a data store includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example.

Data store 308 can store data for the operations of processes, applications, components, and/or modules stored in computer-readable media 304 and/or executed by processing unit(s) 302 and/or accelerator(s). For instance, in some examples, data store 308 can store multiplayer session data 310 and/or profile data 312. The multiplayer session data 310 can comprise a total number of participants in the multiplayer session 104, a mode or category of the title, activity that occurs in the multiplayer session 104 (e.g., behavior, maneuvers, earned points or a score, and/or achievements of the participants), and/or other data related to when and how the multiplayer session 104 is executed or hosted.

Examples of profile data 312 include, but are not limited to, a participant identity (ID) such as a participant tag 314 (e.g., a gamer tag that may keep the player anonymous), participant data 316 (e.g., skill level, performance data, etc.), and text-to-speech (TTS) conversion settings 318. For example, a TTS conversion setting 318 can be universally enabled for any title. In another example, a player may be required to enable the TTS conversion setting 318 upon entry into each multiplayer session. In some instances, the TTS conversion settings 318 can comprise user-defined characteristics for the virtual text entry interface (e.g., size, width/height dimensions, custom text entry options, etc.).

In various examples, before a participant engages in an in-session voice chat experience with other participants of the multiplayer session 104, the participant's privilege and privacy restrictions can be checked to determine banned or blocked participants.

As an alternative, some or all of the above-referenced data can be stored on separate memories 320 on board one or more processing unit(s) 302 such as a memory on board a CPU-type processor, a GPU-type processor, an FPGA-type accelerator, a DSP-type accelerator, and/or another accelerator.

In the illustrated example of FIG. 3, computer-readable media 304 also includes application programming interface (s) (APIs) 322. At least one API is configured to expose the voice chat functionality to, for example, the gaming module 324 (e.g., gaming module 124) executing the multiplayer session 104 and/or program code of the titles 326 (e.g., titles 110). Additionally, computer-readable media 304 includes a chat display module 328 (which may be part of the gaming module 324). The chat display module 328 can be a platform component that is configured to cause the text window and/or the text entry interface to be presented on a display screen (e.g., a display screen associated with client computing device 102(1)) within with a larger user interface that contains the game content. In some instances, the chat display module 328 and/or other platform components can be part of an operating system (e.g., operating system 122).

In one example, the chat display module 328 is configured to render the virtual text entry interface (e.g., via the selection of a particular input or button on a controller) and present the virtual text entry interface on top of game content rendered by program code of a title 326. The virtual text entry interface, in this scenario, may include standard text entry options (e.g., a basic QWERTY or other standard keyboard layout). Alternatively, the virtual text entry interface can include custom text entry options defined by a user. Benefits to using the chat display module 328 to render the virtual text entry interface include: (i) consistency across various titles based on user familiarity with standard text entry options (e.g., the layout of a QWERTY keyboard), and (ii) a title can avoid development and designs costs associated with implementing a virtual text entry interface.

In another example, the title 326 is configured to be notified of a time when the virtual text entry interface is to be displayed (e.g., via the selection of a particular input or button on a controller) and the title 326 is configured to render the virtual text entry interface. Benefits to using the title 326 to render the virtual text entry interface include: (i) enabling the title to have full control over visibility of the virtual text entry interface, (ii) a title can customize text entry options to enable quick replies (e.g., text to be input faster).

The number of illustrated modules is just an example, and the number can vary higher or lower. That is, functionality described herein in association with the illustrated modules can be performed by a fewer number of modules or a larger number of modules on one device or spread across multiple devices.

Figure 4:
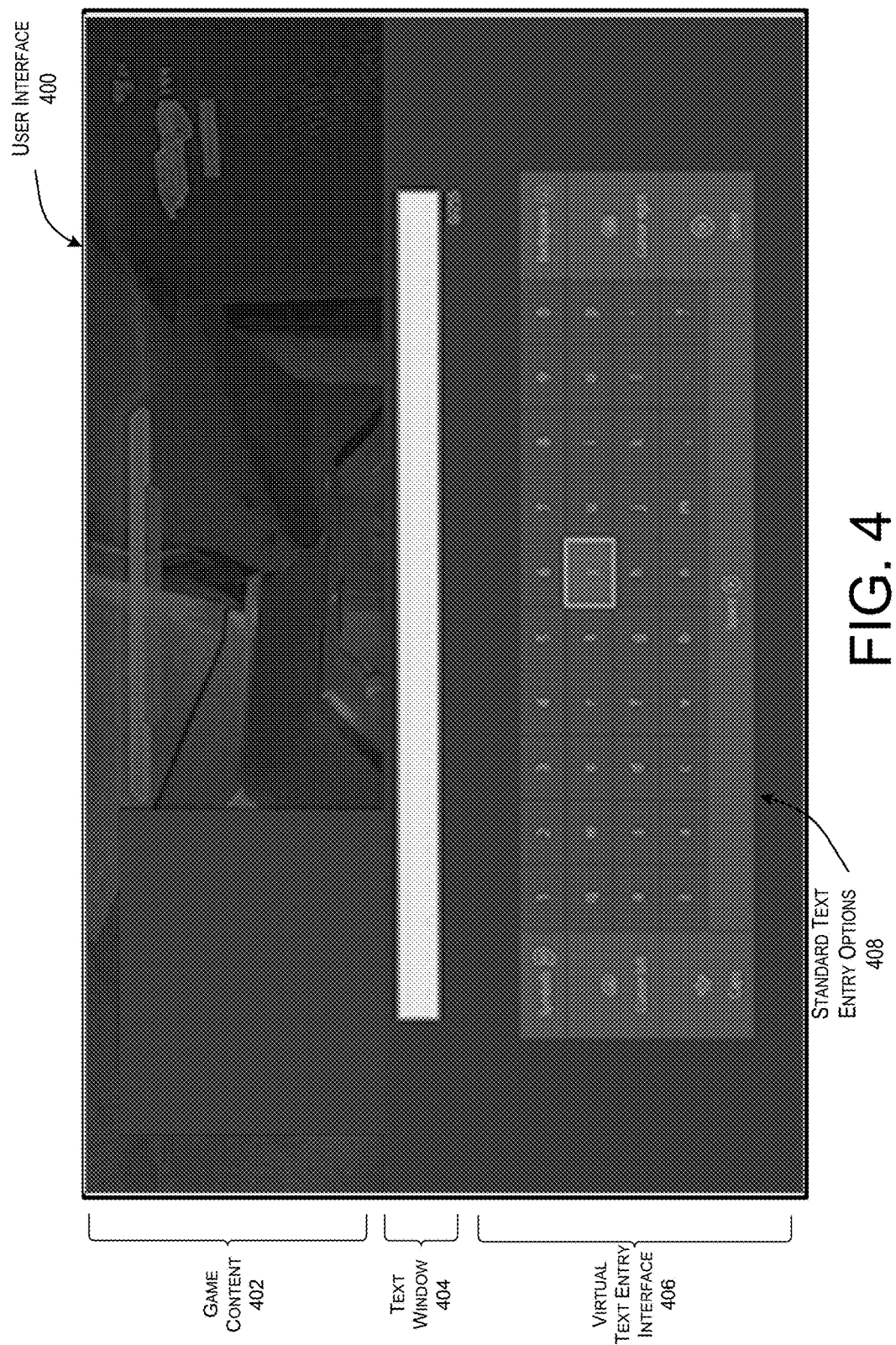
FIG. 4 illustrates an example user interface that includes game content, a text window, and a virtual text entry interface.

FIG. 4 illustrates an example user interface 400 that includes game content 402, a text window 404, and a virtual text entry interface 406. As described above, a participant who is unable or who does not want to communicate with others using voice may be engaging with game content (e.g., playing a game) when he or she decides to send a message (e.g., in response to something that occurred in the game or in response to a voice communication heard via a speaker). Accordingly, the user can provide a command or input (e.g., press a dedicated button on a controller) that causes a virtual text entry interface 406 to be displayed along with the game content 402. In this example, the virtual text entry interface includes standard text entry options 408 (e.g., a QWERTY keyboard). The user can then provide subsequent input to select characters, numbers, and/or punctuation and the selected text can be displayed in the text window 404. When the message is completed, the user can provide a command (e.g., press another button on the controller, select a text entry option in the virtual text entry interface, etc.) to submit the message to the TTS conversion service so it can be converted into speech.

Figure 5:
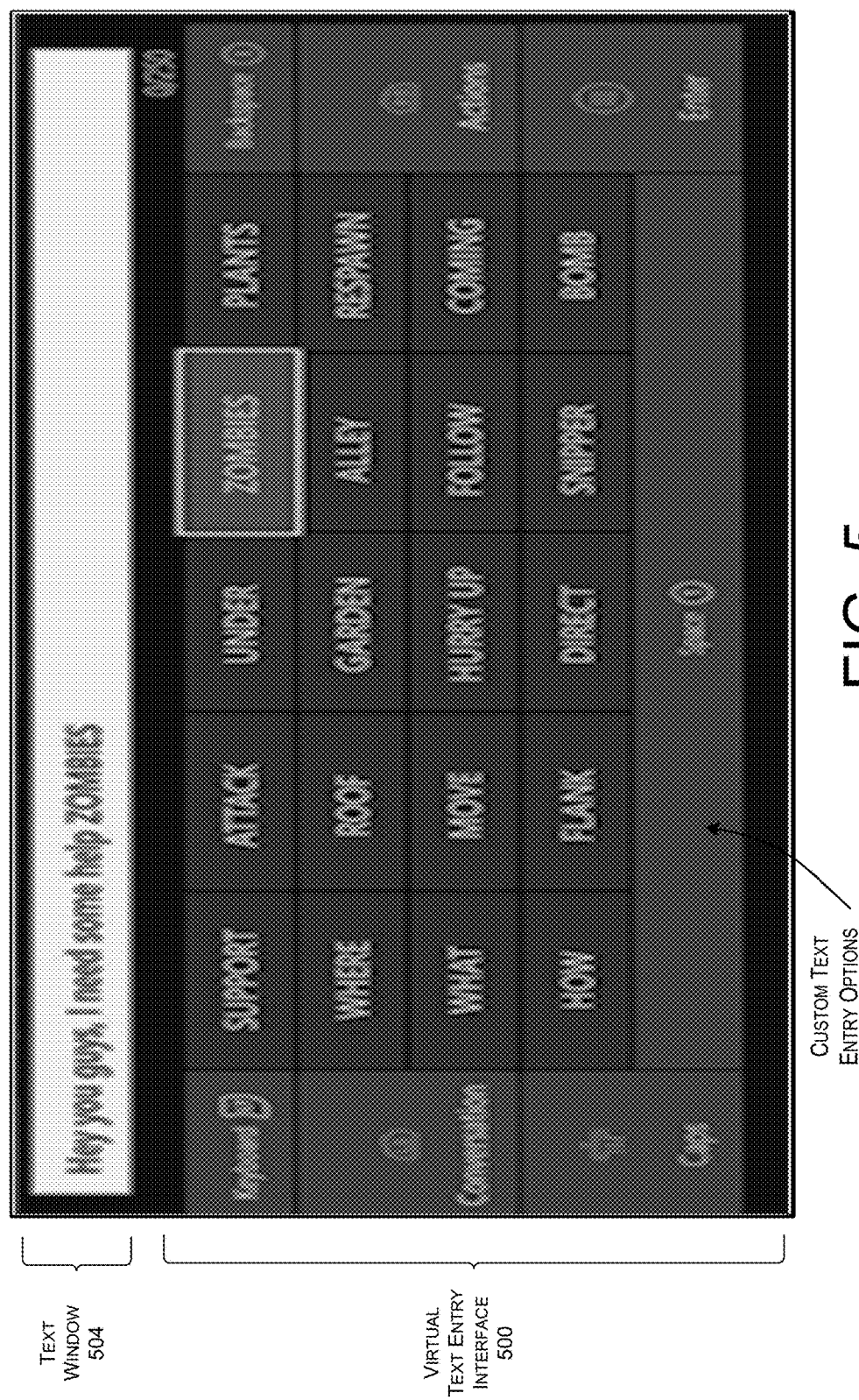
FIG. 5 illustrates an example of a virtual text entry interface with custom text entry options.

FIG. 5 illustrates an example of a virtual text entry interface 500 with custom text entry options 502. Again, when a participant decides to send a message, a command or input can be submitted to have the virtual text entry interface 500 displayed (e.g., the virtual text entry interface 500 can be displayed along with game content and in place of the virtual text entry interface 406 in FIG. 4). However, in this example and upon notification of a request to display a text entry mechanism, the title (e.g., program code) causes the virtual text entry interface 500 to be displayed. As described above, as part of the virtual text entry interface 500, the title can define different words and/or phrases as individual custom text entry options 502 (e.g., FIG. 5 illustrates options such as "support", "attack", "under", "zombies", "plants" and so forth). These words and/or phrases can be commonly used when conversing about the game content of the title, and therefore, presentation of such options enable quicker and more efficient text entry.

In some examples, the title can present the custom text entry options 502 based on a context of an ongoing conversation and/or a context of the game content. That is, if a participant uses the voice chat to ask a question, analysis can be performed on the context of the question and the custom text entry options displayed can be words and/or phrases related to a category of likely replies to the questions. Or, if the current game activity indicates another player scores, then words and/or phrases that are part of a "Compliments" category can automatically be displayed.

In addition to selecting custom text entry options, the virtual text entry interface 500 allows a user to select an option that switched the virtual text entry interface to a format that includes standard text entry options (e.g., a QWERTY keyboard).

Figure 6A:
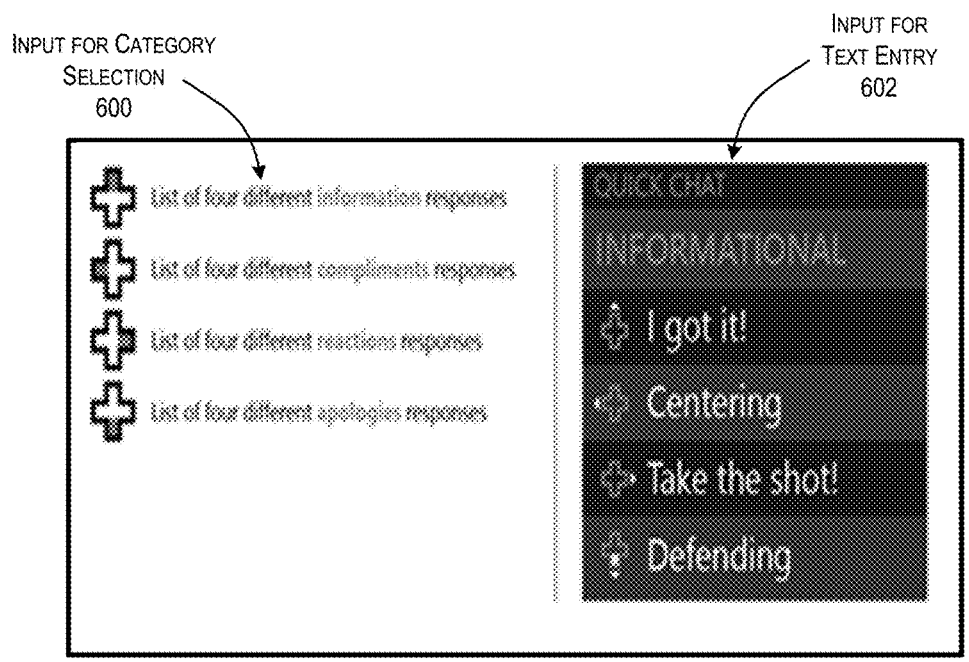
FIG. 6A illustrates an example virtual text entry interface that enables a user to quickly enter text using a predetermined sequence of inputs.

FIG. 6A illustrates an example virtual text entry interface that enables a user to quickly enter custom text using a predetermined sequence of inputs. For example, pressing a direction (up, down, left, right) on a directional pad (D-pad) can comprise a first input that selects a category 600 (e.g., of words and/or phrases). As shown in FIG. 6A, the up direction selects "information" responses that can be entered, the left direction selects "compliments" responses that can be entered, the right direction selects "reactions" responses that can be entered, and the down direction selects "apologies" responses that can be entered. Once the category list is selected and opened, a subsequent input can select the custom text to be entered 602. As shown in FIG. 6A upon selection of the "information" category, the up direction selects "I got it!" which is then inserted into a text window, the left direction selects "Centering" which is then inserted into a text window, the right direction selects "Take the shot!" which is then inserted into a text window, and the down direction selects "Defending" which is then inserted into a text window.

Figure 6B:
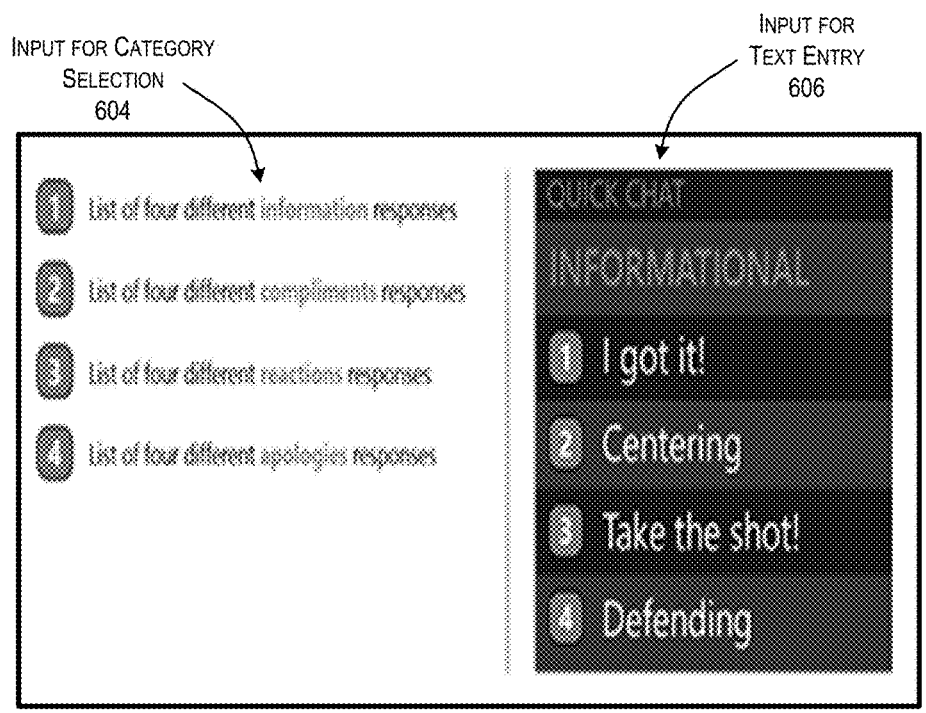
FIG. 6B illustrates another example virtual text entry interface that enables a user to quickly enter text using a predetermined sequence of inputs.

FIG. 6B illustrates another example virtual text entry interface that enables a user to quickly enter custom text using a predetermined sequence of inputs. For example, pressing a number on a controller can comprise a first input that selects a category 604 (e.g., of words and/or phrases). As shown in FIG. 6B, the number "1" selects "information" responses that can be entered, the number "2" selects "compliments" responses that can be entered, the number "3" selects "reactions" responses that can be entered, and the number "4" selects "apologies" responses that can be entered. Once the category list is selected and opened, a subsequent input can select the custom text to be entered 606. As shown in FIG. 6B upon selection of the "information" category, the number "1" selects "I got it!" which is then inserted into a text window, the number "2" selects "Centering" which is then inserted into a text window, the number "3" selects "Take the shot!" which is then inserted into a text window, and the number "4" selects "Defending" which is then inserted into a text window.

In various examples, the virtual text entry interfaces of FIG. 6A and FIG. 6B can be rendered by a platform component (e.g., the chat display module 328) without interacting with or receiving input from a title. For instance, a user can define which categories and/or which custom text to display based on the sequence of inputs (e.g., the user may prefer particular words and/or phrases applicable to any title). Consequently, a sequence of inputs enables the user to enter a "quick chat" response to a conversation. In some instances, the quick chat can be activated using a dedicated button on a controller In some examples, a preconfigured button on a controller (e.g., a left and/or right "bumper" button) can enable a user to scroll through various categories. Or a default category can be automatically displayed based on the context of the conversation and/or the context of the game activity.

Figure 7:
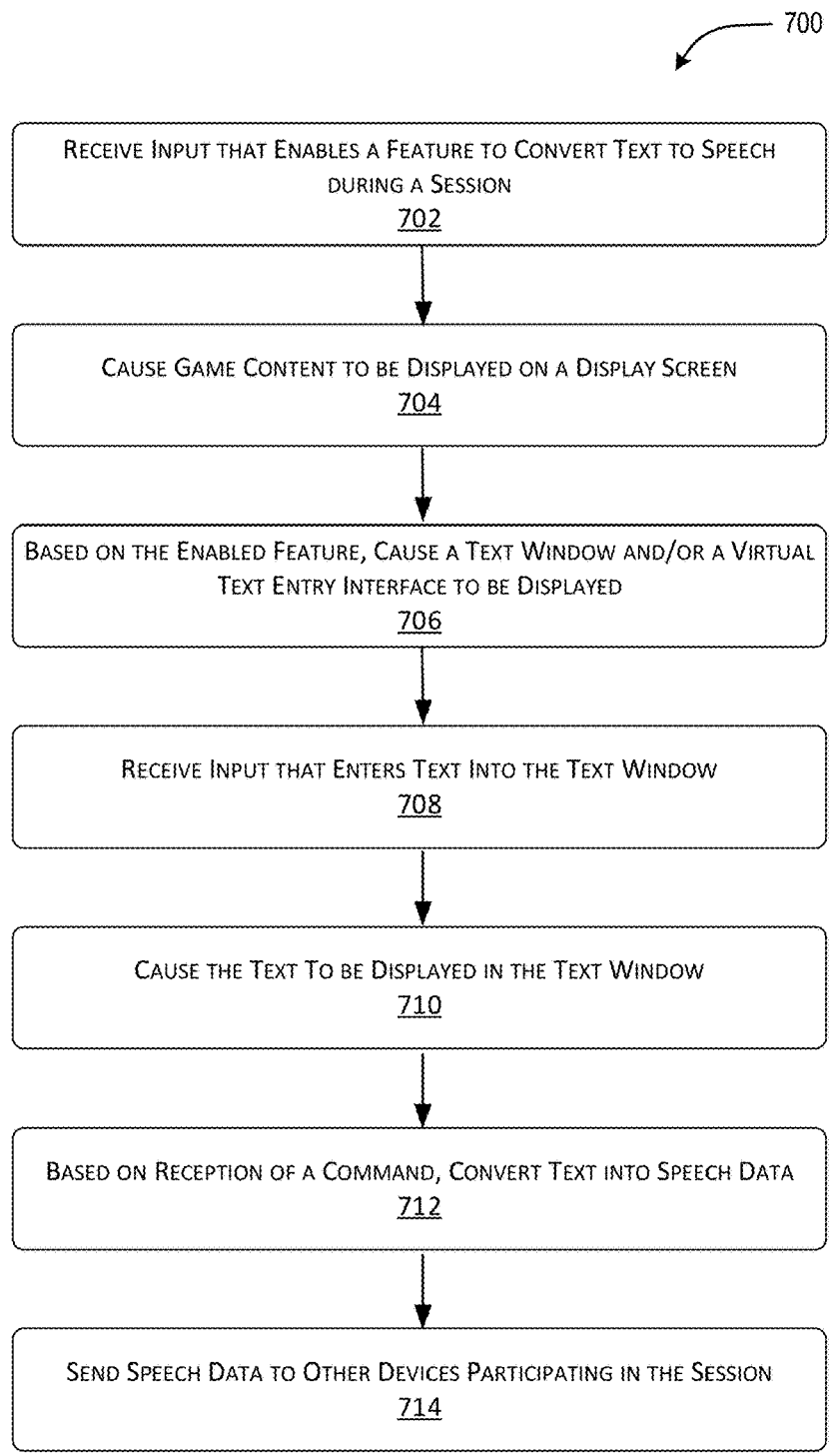
FIG. 7 is a flow diagram of an example method for enabling a feature that converts text to speech.
Figure 8:
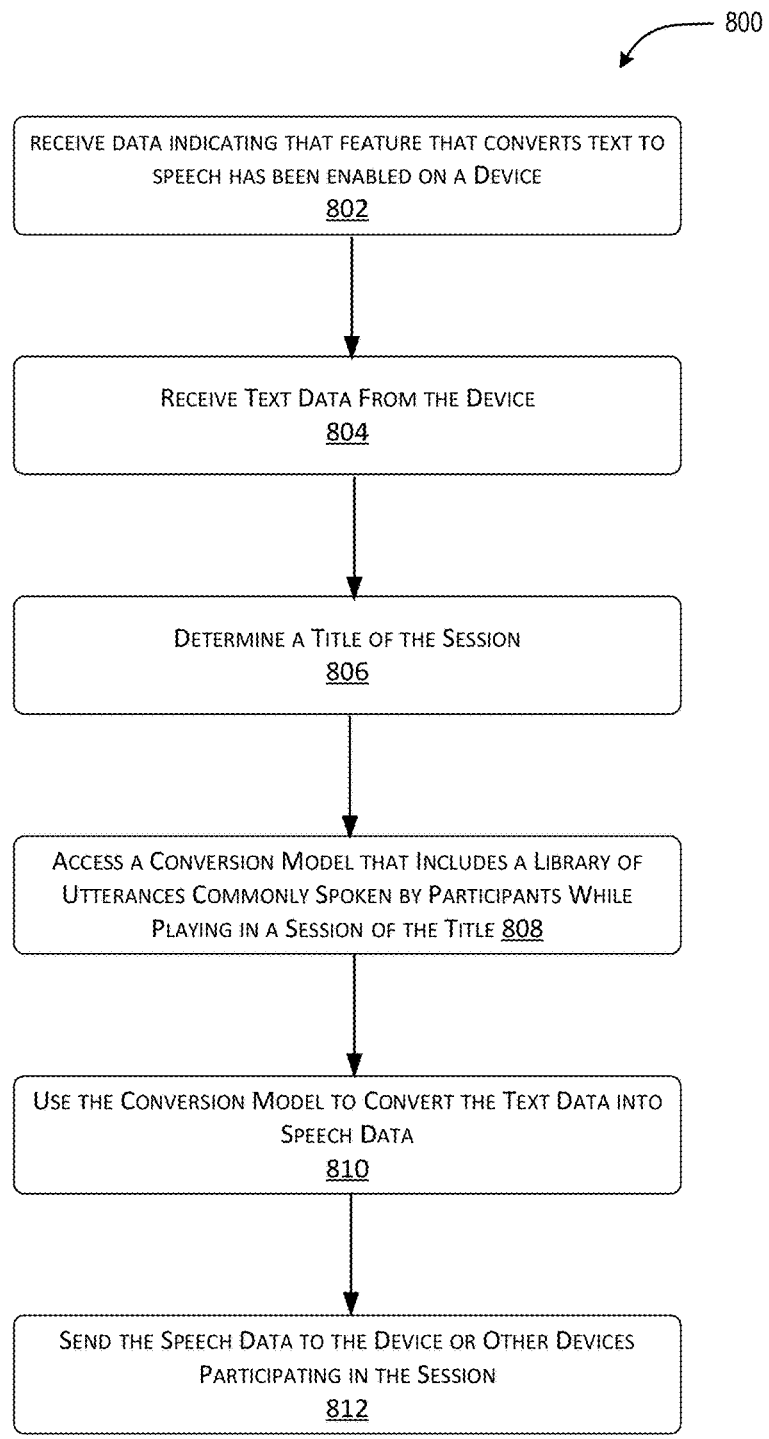
FIG. 8 is a flow diagram of an example method for converting text to speech within a session.

FIGS. 7 and 8 represent example processes in accordance with various examples from the description of FIGS. 7 and 8. The example operations shown in FIGS. 7 and 8 can be implemented on or otherwise embodied in one or more of the various devices described herein. Moreover, modules and/or components can carry out operation(s) of described example processes.

The order in which the operations are described in each example flow diagram is not intended to be construed as a limitation, and any number of the described operations can be combined in any order and/or in parallel to implement each process. Moreover, the operations in each of FIGS. 7 and 8 can be implemented in hardware, software, and/or a combination thereof. In the context of software, the operations represent computer-executable instructions that, when executed by one or more processing units, cause one or more processing units to perform the recited operations. For example, modules and other components described herein can be stored in a computer-readable media and executed by at least one processing unit to perform the described operations. In the context of hardware, the operations can represent logic functions implemented in circuitry (e.g., datapath-control and finite-state-machine sequencing functions).

FIG. 7 is a flow diagram of an example method 700 for enabling a feature that converts text to speech. In various examples, some or all of the operations of the example method 700 are implemented by a client computing device (e.g., 102(1)) associated with a user that is unable to speak or that is incapable of speaking.

At 702, input that enables a feature that converts text to speech during a session is enabled. For example, a user with a speaking impairment may enable the feature for a multi-player session on his or her own device.

At 704, game content is displayed on the device of the user.

At 706, in accordance with a user instruction (e.g., a command or an input), and based on the enabled feature, a text window and/or a virtual text entry interface is displayed within a user interface on a display screen associated with the device.

At 708, input that enters text is received.

At 710, the text entered is caused to be displayed in the text window on the display screen.

At 712, upon review and approval of the displayed text, the user can submit a command that causes the entered text to be converted into speech. For example, text data can be sent to a text-to-speech (TTS) conversion service over a network, and the device can subsequently receive the speech data back from the TTS conversion service. In another example, the conversion can be performed at a client computing device At 714, the speech data is sent, as synthesized voice data, to other devices participating in the session.

FIG. 8 is a flow diagram of an example method 800 for converting text to speech within a session. In various examples, some or all of the operations of the example method 800 are implemented by TTS conversion device (e.g., 112 or 202).

At 802, data indicating that a feature that converts text to speech has been enabled on a device is received. As described above, the device is one that is participating in a multiplayer session 104.

At 804, text data is received from the device.

At 806, a title of the session is determined.

At 808, a conversion model is accessed, the conversion model including a library of utterances commonly spoken by participants while playing in a session of the title.

At 810, the conversion model is used to convert the text data into speech data.

At 812, the speech data is sent back to the device from which the text data was received. Or, alternatively, the speech data can be directly sent to other devices participating in the multiplayer session.

The disclosure presented herein may be considered in view of the following example clauses.

Example Clause A, a device for receiving text to be converted to speech within a session, the device comprising: one or more processing units; and a computer-readable medium having encoded thereon computer-executable instructions to configure the one or more processing units to: receive first input that enables a feature that allows the text to be input during a session; cause game content to be displayed within a user interface on a display screen associated with the device; based on the enabled feature, cause a text window to be displayed within the user interface; receive one or more subsequent inputs that select the text to be converted to speech; cause the text to be displayed in the text window; and based on reception of a command, convert the text into speech data; and send the speech data to other devices participating in the session.

Example Clause B, the device of Example Clause A, wherein the speech data comprises synthesized voice.

Example Clause C, the device of Example Clause A or Example Clause B, wherein the instructions further configure the one or more processing units to: determine a title of the session; access a conversion model that includes a library of utterances commonly spoken by participants while participating in the title of the session; and use the conversion model to convert the text into the speech data.

Example Clause D, the device of any one of Example Clauses A through C, wherein the instructions further configure the one or more processing units to cause a virtual text entry interface to be displayed within the user interface along with the text window, wherein the one or more subsequent inputs are received via the virtual text entry interface.

Example Clause E, the device of Example Clause D, wherein the virtual text entry interface is displayed over the game content.

Example Clause F, the device of Example Clause D or Example Clause E, wherein the virtual text entry interface comprises standard text entry options rendered by a platform component of the device and the virtual text entry interface is useable by a title of the session via an application programming interface.

Example Clause G, the device of Example Clause D or Example Clause E, wherein the virtual text entry interface comprises custom text entry options rendered by a title of the session, the custom text entry options including words or phrases commonly used in the title of the session.

Example Clause H, the device of Example Clause D or Example Clause E, wherein the virtual text entry interface comprises custom text entry options rendered by a platform component of the device, the custom text entry options being defined by a user of the device.

Example Clause I, the device of Example Clause H, wherein the one or more subsequent inputs comprise a sequence of inputs preconfigured to select a particular custom text entry option.

Example Clause J, the device of Example Clause A, wherein the one or more subsequent inputs comprise a sequence of inputs preconfigured to select a word or phrase to be entered in the text window.

Example Clause K, the device of any one of Example Clauses A through J, wherein a setting associated with the enabled feature indicates whether synthesized voice communications based on the text comprises a female synthesized voice or a male synthesized voice.

While the subject matter of Example Clauses A through K is described above with respect to a device, it is understood that the subject matter of Example Clauses A through K can also be implemented via computer-readable storage media and/or as a method.

Example Clause L, a method comprising: receiving, at a first device participating in a session, first input that enables a feature that allows text to be input during the session; causing game content to be displayed within a user interface on a display screen associated with the first device; based on the enabled feature, causing a text window to be displayed on the display screen; receiving one or more subsequent inputs that select the text; causing the text to be displayed in the text window; based on reception of a command, sending the text to a text-to-speech (TTS) conversion service; receiving speech data associated with the text from the TTS conversion service; and sending the speech data to other devices participating in the session.

Example Clause M, the method of Example Clause L, further comprising causing a virtual text entry interface to be displayed within the user interface on the display screen along with the text window, wherein the one or more subsequent inputs are received via the virtual text entry interface.

Example Clause N, the method of Example Clause M, wherein the virtual text entry interface comprises standard text entry options rendered by a platform component of the device and the virtual text entry interface is useable by a title of the session via an application programming interface.

Example Clause O, the method of Example Clause M, wherein the virtual text entry interface comprises custom text entry options rendered by a title of the session, the custom text entry options including words or phrases commonly used in the title of the session.

Example Clause P, the method of Example Clause M, wherein the virtual text entry interface comprises custom text entry options rendered by a platform component of the device, the custom text entry options being defined by a user of the first device.

Example Clause Q, the method of Example Clause P, wherein the one or more subsequent inputs comprise a sequence of inputs preconfigured to select a particular custom text entry option.

Example Clause R, the method of any one of Example Clauses L through Q, wherein a setting associated with the enabled feature indicates whether synthesized voice communications based on the text comprises a female synthesized voice or a male synthesized voice.

While the subject matter of Example Clauses L through R is described above with respect to a method, it is understood that the subject matter of Example Clauses L though R can also be implemented via computer-readable storage media and/or by a device.

Example Clause S, a device for converting text to speech within a session, the device comprising: one or more processing units; and a computer-readable medium having encoded thereon computer-executable instructions to configure the one or more processing units to: receive data indicating that a feature that converts text to speech has been enabled on a first device; receive, from the first device, text data; determine a title of the session; access a conversion model that includes a library of utterances commonly spoken by participants while participating in the title of the session; use the conversion model to convert the text data into speech data; and send the speech data to the first device or other devices participating in the session.

Example Clause T, the device of Example Clause S, wherein the instructions further configure the one or more processing units to use machine learning techniques to update the conversion model based on the text data converted into the speech data.

While the subject matter of Example Clauses S and T is described above with respect to a device, it is understood that the subject matter of Example Clauses S and T can also be implemented via computer-readable storage media and/or as a method.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method for converting text to speech within a session comprising:
    receiving data indicating that a feature that converts text to speech has been enabled for a first player using a first device to participate in the session;
    receiving, from the first device, text data that is included in a category of words or phrases that captures responses to one or more actions performed by other players using other devices to participate in the session;
    determining a title of the session;
    accessing, based on the category of words or phrases, a conversion model that includes a library of utterances commonly spoken by players while participating in the title of the session;
    using the conversion model to convert, by one or more processors, the text data into speech data; and
    sending the speech data to at least one of the first device or the other devices.

2. The method of claim 1, wherein a setting associated with the enabled feature indicates whether synthesized voice communications comprises a female synthesized voice or a male synthesized voice.

3. The method of claim 1, further comprising using machine learning techniques to update the conversion model based on the text data converted into the speech data.

4. The method of claim 1, wherein the speech data comprises synthesized voice.

5. The method of claim 1, wherein the data indicating that the feature that converts text to speech has been enabled is received from a voice chat component of the first device.

6. The method of claim 5, wherein the voice chat component is an operating system component called upon, via an application programming interface, by program code of the title to provide voice chat communications during the session.

7. The method of claim 1, wherein the category of words or phrases comprises common replies to a specific action performed by one of the other players.

8. A device for converting text to speech within a session, the device comprising:
    one or more processing units; and
    a computer-readable medium having encoded thereon computer-executable instructions to configure the one or more processing units to:
        receive data indicating that a feature that converts text to speech has been enabled for a first player using a first device to participate in the session;
        receive, from the first device, text data that is included in a category of words or phrases that captures responses to one or more actions performed by other players using other devices to participate in the session;
        determine a title of the session;
        access, based on the category of words or phrases, a conversion model that includes a library of utterances commonly spoken by players while participating in the title of the session;
        use the conversion model to convert the text data into speech data; and
        send the speech data to at least one of the first device or the other devices.

9. The device of claim 8, wherein the instructions further configure the one or more processing units to use machine learning techniques to update the conversion model based on the text data converted into the speech data.

10. The device of claim 8, wherein the speech data comprises synthesized voice.

11. The device of claim 8, wherein a setting associated with the enabled feature indicates whether synthesized voice communications comprises a female synthesized voice or a male synthesized voice.

12. The device of claim 8, wherein the data indicating that the feature that converts text to speech has been enabled is received from a voice chat component of the first device.

13. The device of claim 12, wherein the voice chat component is an operating system component called upon, via an application programming interface, by program code of the title to provide voice chat communications during the session.

14. The device of claim 8, wherein the category of words or phrases comprises common replies to a specific action performed by one of the other players.

15. One or more computer-readable storage media having encoded thereon computer-executable instructions that, when executed by one or more processing units, cause a system to:
    receive data indicating that a feature that converts text to speech has been enabled for a first player using a first device to participate in a session;
    receive, from the first device, text data that is included in a category of words or phrases that captures responses to one or more actions performed by other players using other devices to participate in the session;
    determine a title of the session;
    access, based on the category of words or phrases, a conversion model that includes a library of utterances commonly spoken by players while participating in the title of the session;
    use the conversion model to convert the text data into speech data; and
    send the speech data to at least one of the first device or the other devices.

16. The one or more computer-readable storage media of claim 15, wherein the computer-executable instructions further cause the system to use machine learning techniques to update the conversion model based on the text data converted into the speech data.

17. The one or more computer-readable storage media of claim 15, wherein the speech data comprises synthesized voice.

18. The one or more computer-readable storage media of claim 15, wherein the data indicating that the feature that converts text to speech has been enabled is received from a voice chat component of the first device.

19. The one or more computer-readable storage media of claim 18, wherein the voice chat component is an operating system component called upon, via an application programming interface, by program code of the title to provide voice chat communications during the session.

20. The one or more computer-readable storage media of claim 15, wherein a setting associated with the enabled feature indicates whether synthesized voice communications comprises a female synthesized voice or a male synthesized voice.

* * * * *